(12) United States Patent
Pasceri et al.

(10) Patent No.: US 9,557,906 B2
(45) Date of Patent: Jan. 31, 2017

(54) VISUALIZATION INFORMATION BAR

(75) Inventors: Vincent Joseph Pasceri, Seattle, WA (US); Diego David Baca Del Rosario, Seattle, WA (US); Wolf Lochland Logan, Mill Creek, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 112 days.

(21) Appl. No.: 13/401,237

(22) Filed: Feb. 21, 2012

(65) Prior Publication Data

US 2013/0215155 A1    Aug. 22, 2013

(51) Int. Cl.
*G09G 5/00* (2006.01)
*G06F 3/0485* (2013.01)

(52) U.S. Cl.
CPC .................................. *G06F 3/0485* (2013.01)

(58) Field of Classification Search
CPC  G06F 3/0485; G06F 3/04812; G06F 3/04855; G09G 5/34; G09G 5/346; G09G 5/14
See application file for complete search history.

(56) References Cited

U.S. PATENT DOCUMENTS

| 7,180,501 | B2 | 2/2007 | Marvit et al. | |
| 2004/0177325 | A1* | 9/2004 | Keane et al. | 715/530 |
| 2005/0033646 | A1* | 2/2005 | Crisp, III | B67D 1/0057 |
| | | | | 705/16 |

(Continued)

OTHER PUBLICATIONS

Czerwinski, Mary, "From Scatterbrained to Focused: UI Support for Today's Crazed Information Worker", Retrieved at <<http://pim.ischool.washington.edu/pim06/files/czerwinski-paper.pdf>>, SIGIR Workshop, Personal Information Management, Aug. 10, 2006, p. 4.

(Continued)

*Primary Examiner* — James A Thompson
*Assistant Examiner* — Xilin Guo
(74) *Attorney, Agent, or Firm* — Steven Spellman; Tom Wong; Micky Minhas

(57) ABSTRACT

Among other things, one or more techniques and/or systems are provided for maintaining an information bar associated with a visualization. The visualization may correspond to an interface configured to display one or more entities (e.g., a map interface may display location entities, such as coffee shops, and/or direction entities, such as portions of a route, within a map). Responsive to the visualization being populated, the information bar may be populated with one or more information panels corresponding to the one or more entities. For example, a first information panel may comprise coffee specials and hours of operation for a first coffee shop entity populated within the visualization. Responsive to a selection of an entity within the visualization, a corresponding information panel may (automatically) be scrolled to and/or highlighted within the information bar. In this way, the information bar may display information panels corresponding to entities of the visualization.

20 Claims, 9 Drawing Sheets

(56) References Cited

U.S. PATENT DOCUMENTS

| | | | |
|---|---|---|---|
| 2006/0271287 A1* | 11/2006 | Gold | G01C 21/26 |
| | | | 701/426 |
| 2008/0147313 A1* | 6/2008 | Nesbitt | G01C 21/367 |
| | | | 701/426 |
| 2009/0158200 A1 | 6/2009 | Palahnuk et al. | |
| 2010/0064239 A1 | 3/2010 | Crawford et al. | |
| 2011/0131526 A1 | 6/2011 | Vronay et al. | |
| 2011/0225506 A1* | 9/2011 | Casalaina | G06F 17/30528 |
| | | | 715/741 |
| 2012/0013548 A1* | 1/2012 | Choi | B60K 35/00 |
| | | | 345/173 |
| 2012/0143963 A1* | 6/2012 | Kennberg | G06Q 10/107 |
| | | | 709/206 |
| 2013/0083076 A1* | 4/2013 | Liu et al. | 345/660 |
| 2013/0132959 A1* | 5/2013 | Moore | G06Q 30/02 |
| | | | 718/100 |
| 2013/0155172 A1* | 6/2013 | Mock | H04N 21/42204 |
| | | | 348/14.03 |

OTHER PUBLICATIONS

Quick, Darren, "Microsoft releases Windows 8 Developer Preview", Retrieved at <<http://www.gizmag.com/windows-8-developer-preview-release/19853/>>, Sep. 15, 2011, p. 6.

Griffin, Darren, "Roadtour Satnav Tour Guide Review", Retrieved at <<http://www.pocketgpsworld.com/roadtour-satnav-tour-guide-review.php>>, Jun. 23, 2008, p. 4.

"Creating Smart Application Layouts with Windows Forms 2.0", Retrieved at <<http://msdn.microsoft.com/en-us/library/aa730847(v=vs.80).aspx>>, Retrieved Date: Feb. 7, 2012, p. 15.

"IOS UI Element Usage Guidelines", Retrieved at <<https://developer.apple.com/library/IOs/#documentation/UserExperience/Conceptual/MobileHIG/UIElementGuidelines/UIElementGuidelines.html>>, Oct. 12, 2011, pp. 105-159.

"Pulse", Retrieved at: http://blog.pulse.me/, Retrieved on Feb. 6, 2012, pp. 1-11.

"Pulse News Launches 2.0 Update for Android and iPhone", Mar. 23, 2011, Retrieved at: http://www.reuters.com/article/2011/03/25/idUS162656+25-Mar-2011+BW20110325, pp. 1-2.

* cited by examiner

VISUALIZATION INFORMATION BAR

Many applications display information through various user interfaces. In one example, a map application may display a map within an interactive map interface, search functionality within a search interface, and/or map directions within a map directions interface. Such interfaces may be specific to a single task and/or context of the map (e.g., the map directions interface may be configured to merely display map directions, but not other content, such as one or more locations identified on the map and/or error messages relating to a task). Accordingly, it may be advantageous to provide a user interface that is readable, scalable, and/or consumable for various scenarios.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for maintaining an information bar associated with a visualization are provided herein. A visualization may correspond to a variety of interfaces configured to display entities (e.g., an image gallery interface may display images, a search result interface may display search results, a map interface may display directions and/or locations, etc.) and/or a variety of form factors (e.g., a mobile device, a smart phone, a tablet device, a desktop device, a touch enabled device, etc.). An information bar may correspond to an interface, such as a horizontal scrollable bar, which may be displayed across a first horizontal portion of the visualization (e.g., the information bar may comprise a user interface container, a user interface surface, and/or other user interface elements configured to display and/or facilitate navigation of informal/informational panels comprising content associated with the visualization). The information bar may be populated with one or more information panels associated with the visualization. For example, an information panel may comprise content associated with an entity populated within the visualization (e.g., responsive to a map visualization being populated with one or more pizza shop entities, content associated with a first pizza shop entity may be populated within a first information panel of the information bar).

The information bar may be contextually aware of the visualization (e.g., particular entities populated within the visualization) and/or tasks associated with the visualization (e.g., a search task for coffee shops, a directions task for driving directions, an explore task for recently viewed businesses, etc.). In one example, responsive to the visualization being populated with one or more location entities (e.g., coffee shop entities corresponding to a search task for "coffee shops near current location" submitted by a user within an input bar), one or more information panels corresponding to respective location entities may be populated within the information bar (e.g., a first information panel may comprise an image and hours of operation for a first coffee shop entity, a second information panel may comprise a summary and coffee specials for a second coffee shop entity, etc.). In another example, responsive to the visualization being populated with one or more direction entities (e.g., direction entities representing portions of a route from a starting location to a destination location), one or more information panels corresponding to respective direction entities may be populated within the information bar (e.g., a first information panel may comprise an image and textual description of a first portion of the route, a second information panel may comprise an image and textual description of a second portion of the route, etc.). In another example, responsive to an error occurring (e.g., a search for "Learning Tower of Pizza" may result in no entities because the search may be spelled incorrectly), an error message may be populated within the information bar. In this way, the information bar may be populated with information panels that may be contextually relevant to the visualization and/or tasks associated with the visualization.

The information bar may be updated based upon a task associated with the visualization. In one example, the information bar may be populated with information panels comprising content associated with local pizza shop entities populated within a map visualization. Responsive to a user selecting a pizza shop entity within the map visualization, a corresponding information panel within the information bar may be highlighted. It may be appreciated that if the highlighted information panel is not visible within the information bar, then the information bar may be scrolled (e.g., automatically, programmatically, etc.) to the highlighted information panel to visually present the highlighted information panel. In another example, responsive to a user selecting an information panel within the information bar, the information panel may be populated with additional details associated with a corresponding entity (e.g., responsive to a user selecting an information panel associated with a first pizza shop entity, user reviews of the first pizza shop entity may be populated within the information panel) and/or the corresponding entity may be highlighted within the visualization (e.g., a pin, flag, etc. on a map may change color, shape, size, etc.).

The information bar may be configured to allow a user to explore and/or navigate between various states of the information bar (e.g., a first state corresponding to a set of pizza shop information panels, a second state corresponding to a set of coffee shop information panels, etc.). In one example, a back command may be implemented for the information bar. For example, the information bar may be populated with pizza shop information panels based upon the visualization being populated with one or more pizza shop entities (e.g., a user may have submitted a search task for pizza shops). A state of the information bar may be saved as a saved state. The saved state may correspond to the pizza shop information panels. Subsequently, the information bar may be populated with one or more coffee shop information panels based upon the visualization being populated with one or more coffee shop entities (e.g., the user may have submitted a subsequent search task for coffee shops). Upon an invocation of the back command (e.g., which may indicate that the user may desire to view the previously displayed pizza shop information panels as opposed to the currently displayed coffee shop information panels), the information bar may be repopulated with the pizza shop information panels using the saved state. It may be appreciated that a variety of other features may be implemented for the information bar (e.g., the information bar may be collapsed, the information bar may be displayed in place of a hidden input bar (e.g., into which query terms may be entered), a height of the information bar may be adjusted, etc.)

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
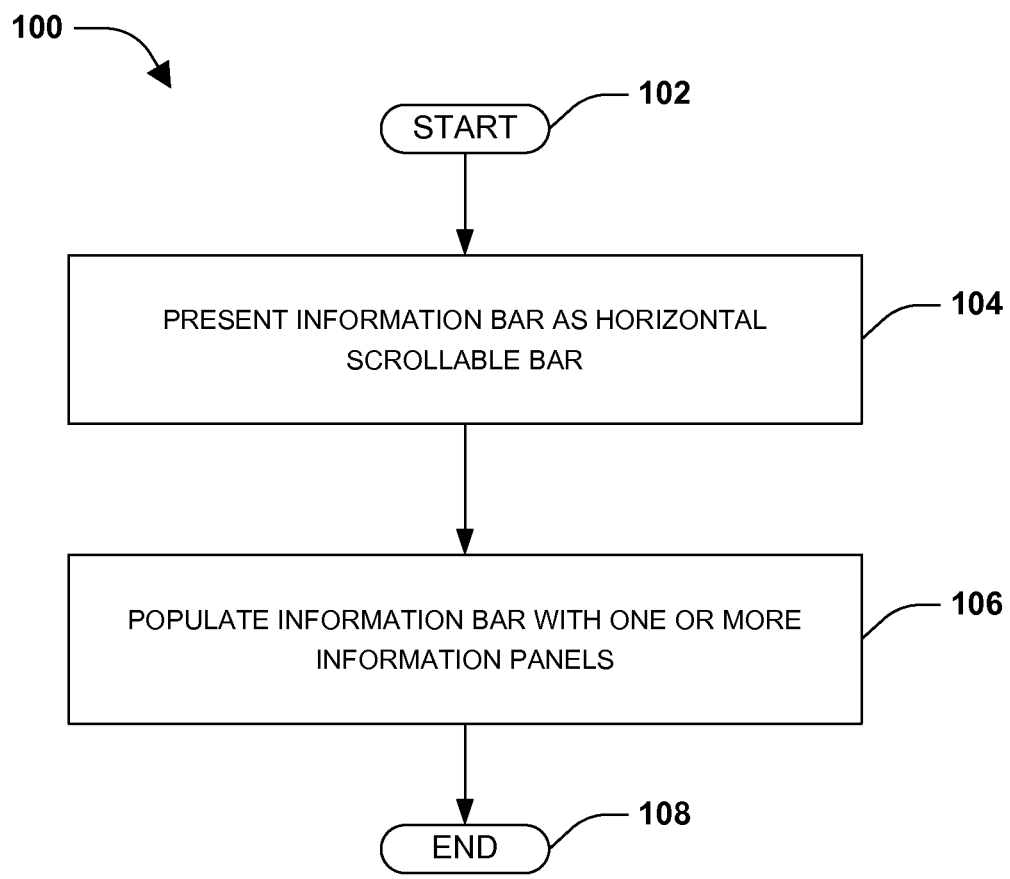
FIG. 1 is a flow diagram illustrating an exemplary method of maintaining an information bar associated with a visualization.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

A visualization may correspond to a variety of interfaces configured to display entities (e.g., an image gallery interface may display images, a search result interface may display search results, a map interface may display directions and/or locations, etc.) and/or a variety of form factors (e.g., a mobile device, a smart phone, a tablet device, a desktop device, a touch enabled device, etc.). An input bar may be associated with the visualization. The input bar may be configured to allow a user to invoke one or more tasks associated with the visualization (e.g., a directions task to populate a map visualization with driving directions, an image search task to populate an image visualization with images, a search result task to populate a search result visualization with search results, an explore task to display recently viewed and/or favorite business listings, etc.). For example, a user may input an image search query to invoke an image search task through the input bar. Responsive to the image search query, an image visualization may be populated with one or more image entities matching the image search query.

It may be advantageous to provide an additional user interface configured to provide information panels comprising content that is contextually relevant to a particular task and/or a state of the visualization. Accordingly, one or more systems and/or techniques for maintaining an information bar associated with a visualization are provided herein. The information bar may correspond to a user interface, such as a horizontal scrollable bar across the visualization. The information bar may be configured to display and/or facilitate navigation of information panels comprising content corresponding to entities populated within the visualization, tasks associated with the visualization, and/or error messages associated with the visualization, for example. In this way, the information bar may display content that is contextually relevant to the visualization.

One embodiment of maintaining an information bar associated with a visualization is illustrated by an exemplary method 100 in FIG. 1. At 102, the method starts. A visualization may correspond to an interface configured to display entities (e.g., a map visualization may display location entities, such as coffee shops, relating to a search task and/or direction entities, such as portions of a route, relating to a directions task). The visualization may be associated with an input bar through which a user may invoke one or more tasks associated with the visualization (e.g., the input bar may be presented across a second horizontal portion of the visualization). For example, the input bar may allow a user to search for directions within a map visualization (e.g., a directions task), search for businesses within the map visualization (e.g., a search task), locate favorite and/or previously viewed locations within the map visualization (e.g., an explore task), etc. The visualization may be associated with an information bar configured to display information panels comprising content that may be contextually relevant to the visualization and/or a task associated with the visualization (e.g., the information bar may be presented within a first horizontal portion of the visualization, which may be adjacent to the second horizontal portion comprising the input bar). One example of an information bar 202 and/or an input bar 204 is illustrated within FIG. 2. At 104, the information bar may be presented as a horizontal scrollable bar across the first horizontal portion of the visualization.

In one example, the visualization may be populated with one or more entities (e.g., a map visualization may be populated with one or more coffee shop entities based upon a search task for "coffee shops" submitted through the input bar). Responsive to the visualization being populated with the one or more entities, the information bar may be populated with one or more information panels corresponding to respective entities populated with the visualization, at 106. For example, a first information panel corresponding to a Colleen's Coffee Shop entity may be populated with an image and hours of operation for Colleen's Coffee Shop, a second information panel corresponding to a Jack's Coffee and Tea Shop entity may be populated with drink specials and an address for Jack's Coffee and Tea Shop, etc. In one example of populating the information bar, the one or more information panels may be organized horizontally adjacent to one another within the information bar, which may enable horizontal scrolling between information panels (e.g., a user may scroll into and/or out of view information panels within the information bar using various finger swipe gestures). In this way, the information bar may be populated with one or more information panels comprising content associated with the one or more entities populated within the visualization.

It may be appreciated that an information panel may be populated with a variety of information and/or content based upon the context of the visualization and/or a task associated with the visualization. For example, an information panel may be populated with an image, text, video, audio, an interactive object, a hyperlink, a business listing, a map, a stream of data, an error message of a failed task, previously viewed content, content marked as favorite content, and/or a plethora of other information.

In one example of presenting the information bar, the input bar may be visually hidden to provide additional viewable space for the visualization and/or the information bar (e.g., the input bar may be hidden in response to the visualization being populated with one or more entities). In this way, the information bar may be presented across at least a portion of the second horizontal portion within which the input bar was previously presented. That is, the input bar may be visually hidden, and the information bar may be move from the first horizontal portion to the horizontal second portion, which may allow the visualization to extent into the first horizontal portion (e.g., an input bar has been hidden and an information bar 402 have been moved into the prior location of the input bar within FIG. 4). Hiding the input bar (e.g., and moving the information bar) may allow for a greater portion of the visualization to be displayed.

The information bar may be contextually associated with the visualization and/or tasks associated with the visualization. In one example, an information panel within the information bar may be highlighted based upon a selection of a corresponding entity within the visualization (e.g., responsive to a user selecting the Colleen's Coffee Shop entity within the map visualization, an information panel comprising an image and hours of operation for Colleen's Coffee Shop may be highlighted within the information bar). If the highlighted information panel is not visible within the information bar (e.g., the highlighted information panel is scrolled outside of the visible area of the information bar), then the information bar may be scrolled (e.g., automatically, programmatically, etc.) to the highlighted information panel to visually present the highlighted information panel. In another example, a user may select an information panel within the visualization. Responsive to the selection of the information panel, additional details associated with a corresponding entity may be populated within the information panel and/or the corresponding entity may be highlighted within the visualization (e.g., responsive to a user selecting the information panel associated with Colleen's Coffee Shop, the information panel may be populated with user reviews for Colleen's Coffee Shop and/or the Colleen's Coffee Shop entity within the map visualization may be highlighted).

It may be appreciated that a variety of commands may be implemented for the information bar. In one example, the information bar may be horizontally scrolled responsive to a horizontal scroll command. For example, the information bar may initially display a first set of information panels (e.g., a first information panel, a second information panel, and a third information panel). The information bar may be scrolled (e.g., right to left) based upon a horizontal scroll command (e.g., a finger swipe gesture), such that a second set of information panels may be displayed (e.g., the third information panel, a fourth information panel, and a fifth information panel). In another example, the information bar may be collapsed (e.g., at least a portion of the information bar may be visually hidden) responsive to a collapse command. An expand command may be presented, which may be invoked to expand the information bar back into view. In another example, a height of the information bar may be adjusted based upon a height command and/or based upon one or more information panels populated therein (e.g., the height of the information bar may be expanded based upon an information panel comprising more information than the information bar may be able to display).

In another example, a back command may be implemented based upon a saved state of the information bar. For example, a state of the information bar may be saved as the saved state. The saved state may comprise information associated with one or more information panels populated within the information bar (e.g., the information bar may comprise a Dan's Pizza Shop information panel, a John's Sub Shop information panel, and a Sue's Pizza Shop information panel, etc.). The one or more information panels within the information bar may be subsequently removed (e.g., based upon a new search for Donut Shops), and one or more new information panels may be populated within the information bar (e.g., a Bill's Donut Shop information panel, etc.). The user may invoke a back command (e.g., because the user may desire to revisit the pizza shop information panels). Responsive to the back command, the one or more new information panels may be removed from the information bar (e.g., the donut shop information panels), and the information bar may be repopulated with the one or more information panels (e.g., the pizza shop information panels) saved within the saved state. At 108, the method ends.

Figure 2:
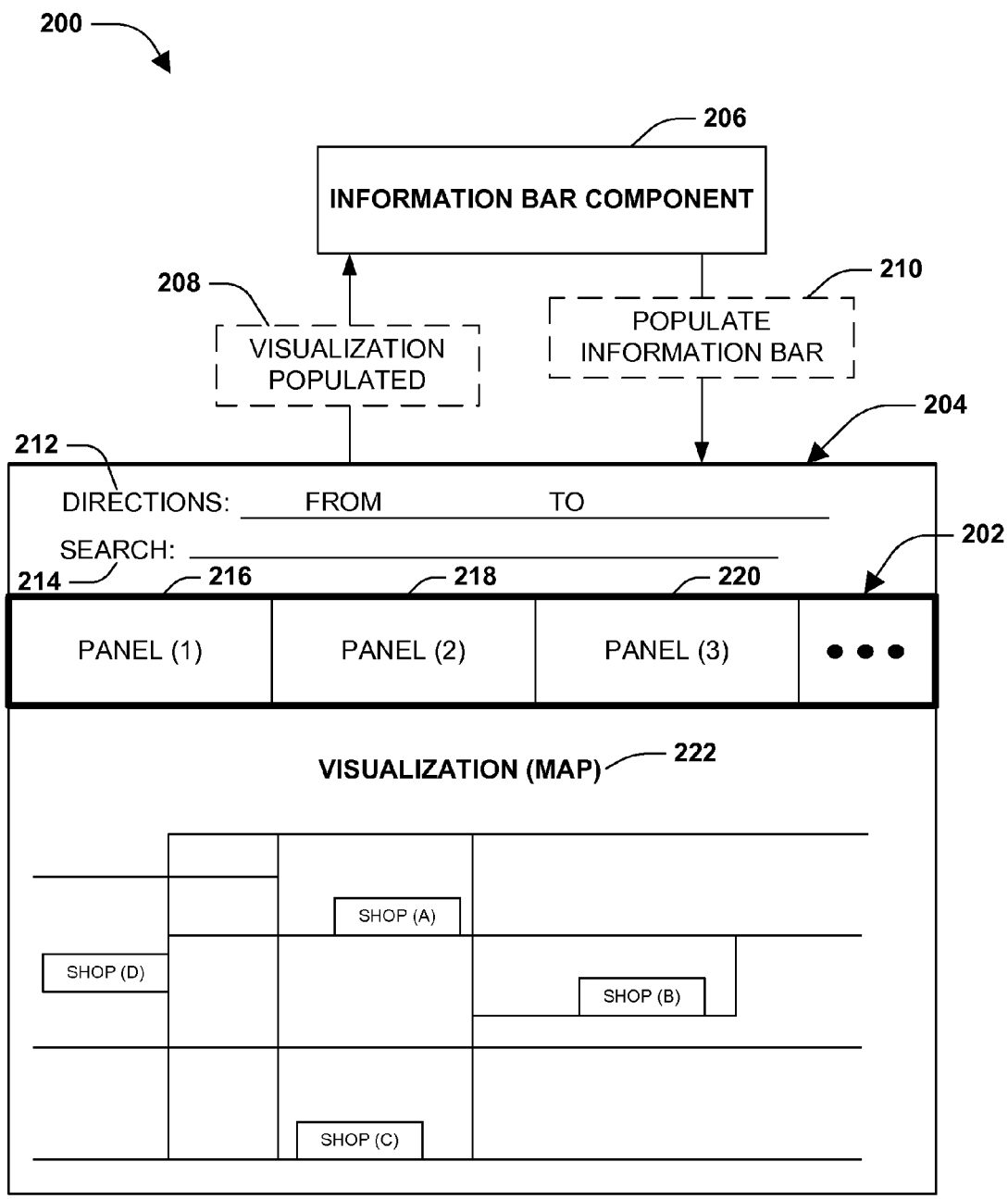
FIG. 2 is a component block diagram illustrating an exemplary system for maintaining an information bar associated with a visualization.

FIG. 2 illustrates an example of a system 200 configured for maintaining an information bar 202 associated with a visualization 222. In one example, the visualization 222 may comprise an interactive map. It may be appreciated that the visualization 222 may correspond to a variety of interfaces (e.g., a weather interface, a search results interface, an image gallery interface, a map interface, etc.). The visualization 222 may be associated with an input bar 204 (e.g., via which one or more queries, operations, tasks, etc. may be invoked). In one example, the input bar 204 may allow a user to invoke a map directions task 212 (e.g., which may populate the visualization 222 with a set of direction entities corresponding to a route from a starting location to a destination location). In another example, the input bar 204 may allow the user to invoke a search task 214 (e.g., which may populate the visualization 222 with a set of business entities corresponding to a search query for a type of business).

The system 200 may comprise an information bar component 206. The information bar component 206 may be configured to present the information bar 202 as a horizontal scrollable bar across a first portion of the visualization 222 (e.g., the first portion may be horizontally adjacent and/or below a second portion within which the input bar 204 is presented, thus resulting in input bar 204 being presented above the information bar 202 and the visualization 222 being presented below the information bar 202). It may be appreciated that the input bar 204 and/or the information bar 202 may be presented in a variety of configurations with respect to the visualization 222 and/or one another (e.g., the input bar 204 and/or the information bar 202 may be presented below the visualization 222). The information bar component 206 may be configured to collapse the information bar 202 and/or the input bar 204, which may provide additional viewing space for the visualization 222. In one example, the input bar 204 may be collapsed (e.g., based upon a completion of a task that resulted in populating the visualization 222), while the information bar 202 may be displayed at a location overlapping the prior location of the input bar 204. In another example, the information bar 202 may be collapsed based upon a collapse command.

The information bar component 206 may be configured to populate 210 the information bar 202 with one or more information panels in response to the visualization 222 being populated 208 with one or more entities (e.g., a first information panel 216 corresponding to Shop (A) entity, a second information panel 218 corresponding to Shop (B) entity, a third information panel 220 correspond to Shop (C) entity, etc.). For example, a user may invoke the search task 214 to search for "shops". Responsive to the search task 214, the visualization 222 may be populated with the Shop (A) entity, the Shop (B) entity, the Shop (C) entity, and/or the Shop (D) entity. In one example, the input bar 204 may be collapsed/hidden because the user has already invoked the search task 214, which may provide for additional viewing space for the visualization 222. Accordingly, the information bar 202 may be populated with the first information panel 216 comprising content associated with the Shop (A) entity, the second information panel 218 comprising content associated with the Shop (B) entity, the third information panel 220 comprising content associated with the Shop (C) entity, and a fourth information panel not illustrated comprising content associated with the Shop (D) entity, etc.

The information bar component 206 may be configured to scroll to and/or highlight an information panel within the information bar 202 in response to a selection of an entity within the visualization 222. In one example, in response to a user selecting the Shop (A) entity within the visualization 222, the information bar component 206 may highlight the first information panel 216 corresponding to the Shop (A) entity. In another example, in response to the user selecting the Shop (D) entity within the visualization 222, the information bar component 206 may highlight and scroll into view the fourth information panel corresponding to the Shop (D) entity.

The information bar component 206 may be configured to populate an information panel with additional details and/or highlight a corresponding entity within the visualization 222 based upon a selection of the information panel within the information bar 202. For example, in response to a user selecting the second information panel 218, the information bar component 206 may populate the second information panel 218 with additional details (e.g., user reviews, a menu, food specials, etc.) relating to the Shop (B) entity and/or may highlight the Shop (B) entity within the visualization 222.

The information bar component 206 may be configured to save a state of the information bar as a saved state. The saved state may correspond to the one or more information panels populated within the information bar 202. The information bar component 206 may be configured to restore the state of the information bar 202 using the saved state (e.g., in response to a back command, the information bar 202 may be populated with previously displayed information panels saved within the saved state).

Figure 3:
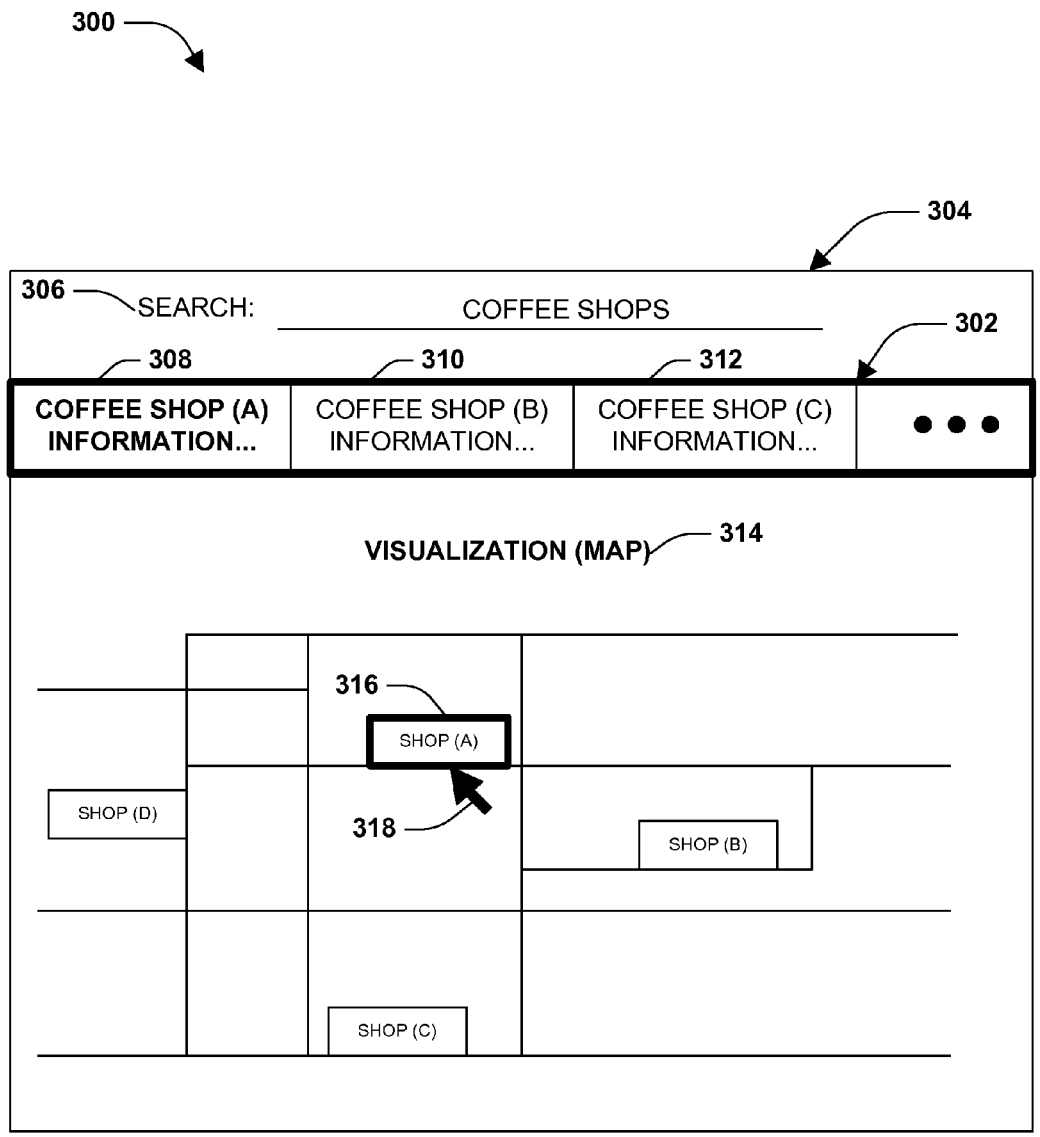
FIG. 3 is an illustration of an example of a visualization associated with an information bar and/or an input bar.

FIG. 3 illustrates an example 300 of a visualization 314 associated with an information bar 302 and/or an input bar 304. In one example, the visualization 314 may correspond to a map interface (e.g., which may currently display a map of a local town). It may be appreciated that the visualization 314 may correspond to a variety of interfaces (e.g., an image gallery interface, a search result interface, etc.) and/or a variety of form factors (e.g., a mobile device, a smart phone, a tablet device, a desktop device, a touch enabled device, etc.). The input bar 304 may comprise a search task 306 that may be invoked by a user to populate the visualization 314 with one or more entities corresponding to the search task 306. For example, a user may submit a search query "coffee shops" through the search task 306. In response to the search query, one or more coffee shop entities may be populated within the visualization 314 (e.g., a Shop (A) entity 316, Shop (B) entity, Shop (C) entity, and Shop (D) entity). In one example, the input bar 304 may be visually hidden based upon the visualization 314 being populated with the one or more coffee shop entities to provide additional viewable space for the visualization 314 (e.g., FIG. 4 illustrates an example of a hidden input bar).

Responsive to the visualization 314 being populated with the one or more coffee shop entities, the information bar 302 may be populated with one or more information panels corresponding to the coffee shop entities. That is, the information bar 302 is populated based upon the search task 306 and/or the context of the visualization 314 (e.g., the coffee shop entities populated within the visualization 314). For example, the information bar 302 may comprise a first information panel 308 comprising content associated with the Shop (A) entity 316, a second information panel 310 comprising content associated with the Shop (B) entity, a third information panel 312 comprising content associated with Shop the (C) entity, a fourth information panel scrolled out of view comprising content associated with the Shop (D) entity. A user may be able to horizontally scroll between the information panels within the information bar 302 (e.g., a horizontal finger swipe from right to left may scroll the first information panel 308 out of view and the fourth information panel into view).

The information bar 302 may be updated based upon a current state of the visualization 314 and/or a task associated with the visualization 314. In one example, a user may select 318 the Shop (A) entity 316 within the visualization 314. Responsive to the selection 318 of the Shop (A) entity 316, the first information panel 308 may be highlighted. In another example, the user may select the Shop (D) entity within the visualization 314. Responsive to the selection of the Shop (D) entity, the fourth information panel may be scrolled into view and/or highlighted within the visualization 314. In this way, the information bar 302 may display information panels comprising content associated with a context of the visualization 314 and/or tasks associated with the visualization 314.

Figure 4:
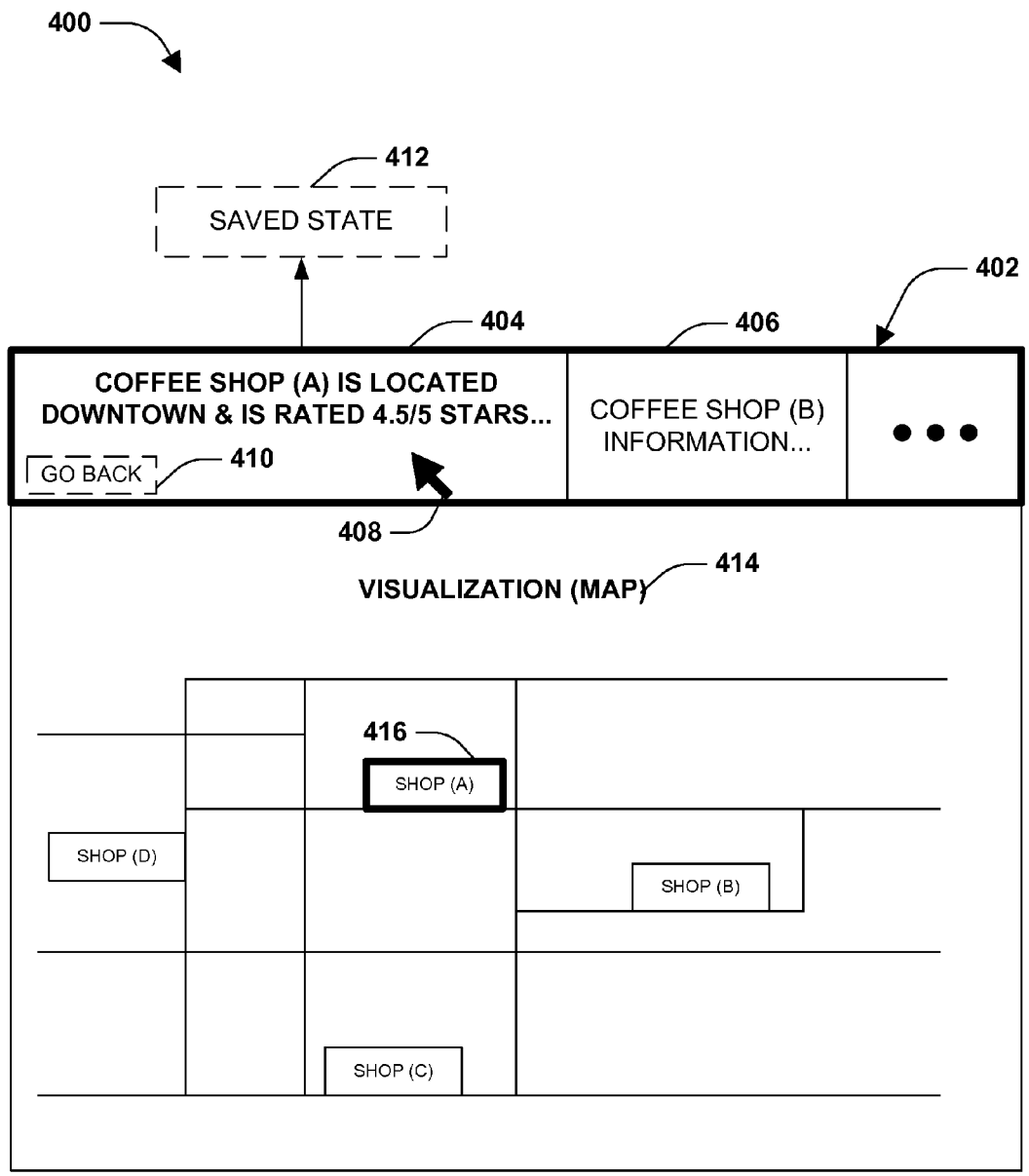
FIG. 4 is an illustration of an example of a visualization associated with an information bar and/or an input bar.

FIG. 4 illustrates an example 400 of a visualization 414 associated with an information bar 402 and/or an input bar. In one example, the visualization 414 may correspond to a map interface (e.g., which may currently display a map of a local town). It may be appreciated that the visualization 414 may correspond to a variety of interfaces (e.g., an image gallery interface, a search result interface, etc.) and/or a variety of form factors (e.g., a mobile device, a smart phone, a tablet device, a desktop device, a touch enabled device, etc.). In one example, the input bar may comprise a search task that may have been invoked by a user to search for coffee shops. Responsive to the visualization 414 being populated with one or more coffee shop entities, the input bar may have been visually hidden to provide for additional viewable space for the visualization 414 and/or the information bar 402.

The information bar 402 may have been populated with one or more information panels based upon the visualization 414 being populated with the one or more coffee shop entities. That is, the information bar 402 may have been populated based upon the search task and/or the context of the visualization 414. For example, the information bar 402 may comprise a first information panel 404 comprising content associated with a Shop (A) entity 416, a second information panel 406 comprising content associated with a Shop (B) entity, and/or other information panels scrolled out of view corresponding to Shop (C) entity and/or Shop (D) entity, for example.

The visualization 414 and/or the information bar 402 may be updated based upon user interaction with an information panel. In one example, a user may select 408 the first information panel 404 associated with the Shop (A) entity 416. Responsive to the selection 408, additional details (e.g., user rating and location information) associated with the Shop (A) entity 416 may be populated within the first information panel 404 and/or the Shop (A) entity 416 may be highlighted within the visualization 414.

The information bar 402 may facilitate navigation of information panels populated therein. For example, a back command 410 may be implemented for the information bar 402, which may allow a user to view a previous state of the information bar 402. In particular, a state of the information bar 402 may be saved as saved state 412. The saved state 412 may comprise information about the first information panel 404, the second information panel 406, and/or other information panels within the information bar 402. Subsequently, the information bar 402 may be populated with one or more new information panels. For example, a user may incorrectly invoke a directions task (e.g., by inputting an invalid destination location). Responsive to the directions tasks error, the information bar 402 may be populated with an information panel comprising error message information. Because the user may desire to abandon the search and/or may desire to view the Coffee Shop related information panels again, the user may invoke the back command 410. Responsive to the invocation of the back command 410, the information bar 402 may be (re)populated with the first information panel 404, the second information panel 406, and/or other information panels using the saved state 412.

Figure 5:
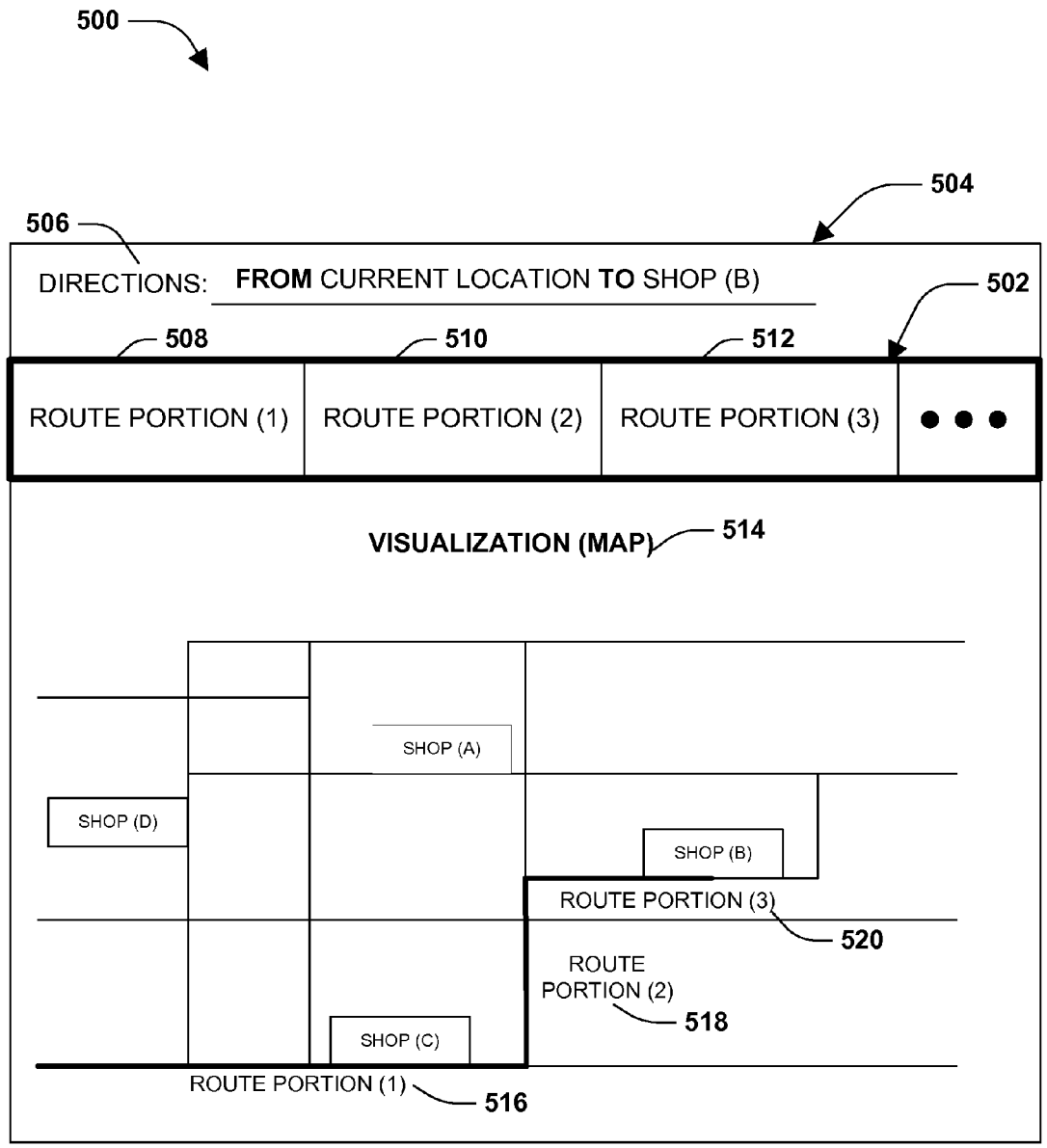
FIG. 5 is an illustration of an example of a visualization associated with an information bar and/or an input bar.

FIG. 5 illustrates an example 500 of a visualization 514 associated with an information bar 502 and/or an input bar 504. In one example, the visualization 514 may correspond to a map interface (e.g., which may currently display a map of a local town). It may be appreciated that the visualization 514 may correspond to a variety of interfaces (e.g., an image gallery interface, a search result interface, etc.) and/or a variety of form factors (e.g., a mobile device, a smart phone, a tablet device, a desktop device, a touch enabled device, etc.). The input bar 504 may comprise a directions task 506 that may be invoked by a user to populate the visualization 514 with one or more direction entities corresponding to the directions task 506 (e.g., a direction entity may correspond to a portion of a route from a starting location to a destination location). For example, a user may submit a direction query "From current location To Shop (B)" through the directions task 506. In response to the direction query, one or more direction entities may be populated within the visualization 514 (e.g., a route portion (1) entity 516, a route portion (2) entity 518, and a route portion (3) entity 520). In one example, the input bar 504 may be visually hidden based upon the visualization 514 being populated with the one or more direction entities to provide additional viewable space for the visualization 514 (e.g., FIG. 6 illustrates an example of a hidden input bar).

Responsive to the visualization 514 being populated with one or more direction entities, the information bar 502 may be populated with one or more information panels corresponding to the direction entities. That is, the information bar 502 is populated based upon the direction task 506 and/or the context of the visualization 514. For example, the information bar 502 may comprise a first information panel 508 comprising content associated with the route portion (1) entity 516, a second information panel 510 comprising content associated with the route portion (2) entity 518, and a third information panel 512 comprising content associated with the route portion (3) entity 520.

Figure 6:
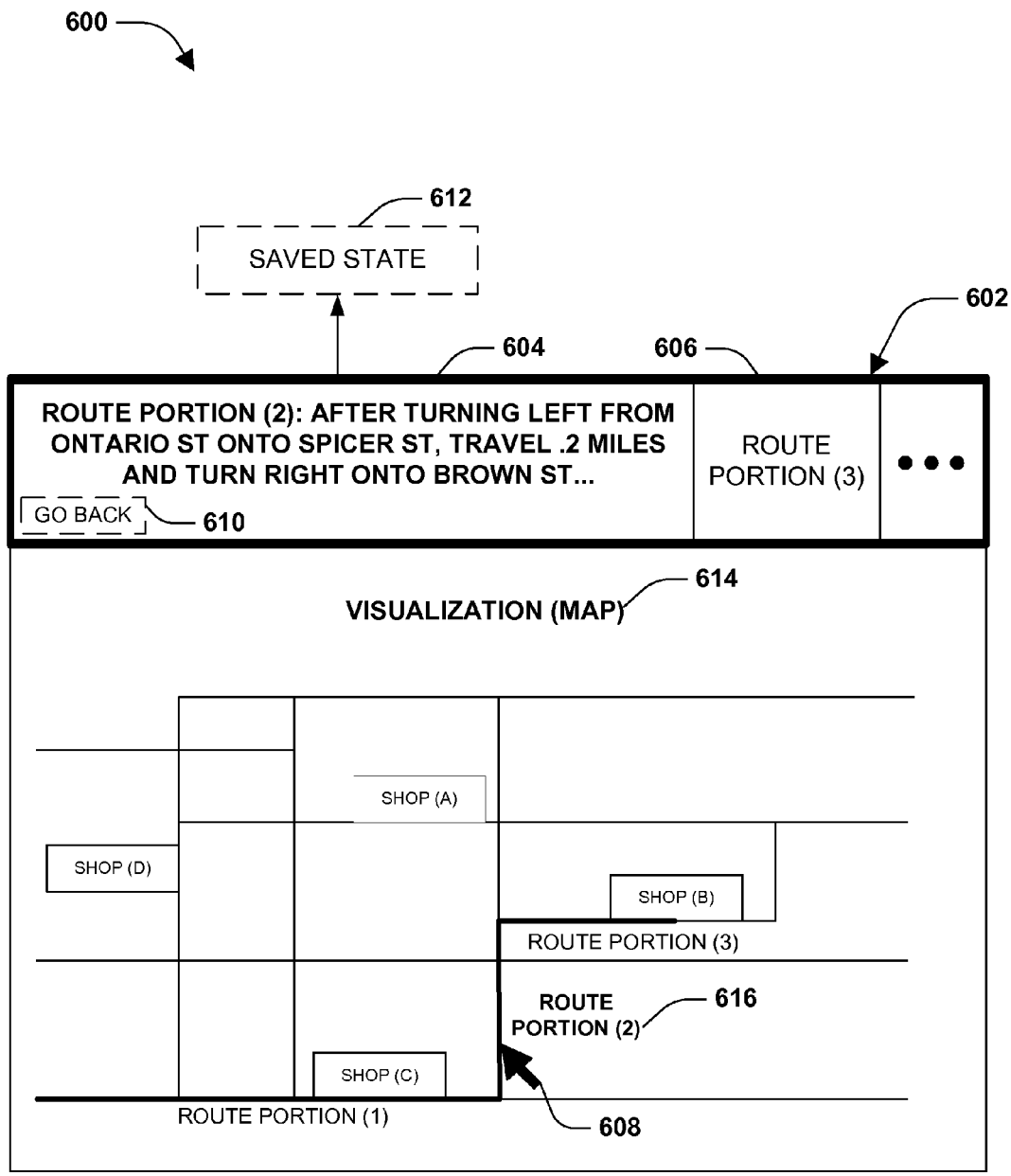
FIG. 6 is an illustration of an example of a visualization associated with an information bar and/or an input bar.

FIG. 6 illustrates an example 600 of a visualization 614 associated with an information bar 602 and/or an input bar. In one example, the visualization 614 may correspond to a map interface (e.g., which may currently display a map of a local town). It may be appreciated that the visualization 614 may correspond to a variety of interfaces (e.g., an image gallery interface, a search result interface, etc.) and/or a variety of form factors (e.g., a mobile device, a smart phone, a tablet device, a desktop device, a touch enabled device, etc.). In one example, the input bar may comprise a directions task that may have been invoked by a user to search for driving directions. Responsive to the visualization 614 being populated with one or more direction entities, the input bar may have been visually hidden to provide for additional viewable space for the visualization 614 and/or the information bar 602.

The information bar 602 may have been populated with one or more information panels based upon the visualization 614 being populated with the one or more direction entities. That is, the information bar 602 may have been populated based upon the directions task and/or the context of the visualization 614. For example, the information bar 602 may comprise a first information panel scrolled out of view comprising content associated with a route portion (1) entity, a second information panel 604 comprising content associated with a route portion (2) entity 616, and a third information panel 606 comprising content associated with a route portion (3) entity. A user may be able to horizontally scroll between the information panels within the information bar 602 (e.g., a horizontal finger swipe from left to right may scroll the third information panel 606 out of view and the first information panel into view).

The information bar 602 may be updated based upon a current state of the visualization 614 and/or a task associated with the visualization 614. In one example, a user may select 608 the route portion (2) entity 616 within the visualization 614. Responsive to the selection 608 of the route portion (2) entity 616, the second information panel 604 may be highlighted. In another example, the user may select the route portion (1) entity within the visualization 614. Responsive to the selection of the route portion (1) entity, the first information panel may be scrolled (e.g., automatically, programmatically, etc.) into view and/or highlighted within the visualization 614. In this way, the information bar 602 may display information panels and/or content associated with a context of the visualization 614 and/or tasks associated with the visualization 614.

The information bar 602 may facilitate navigation of information panels populated therein. For example, a back command 610 may be implemented for the information bar 602, which may allow a user to view a previous state of the information bar 602. In particular, a state of the information bar 602 may be saved as saved state 612. The saved state 612 may comprise information about the first information panel, the second information panel 604, the third information panel 606, and/or other information panels within the information bar 602. Subsequently, the information bar 602 may be populated with one or more new information panels. For example, a user may invoke a search task for "national parks", which may result in the visualization 614 being populated with one or more national park entities. Responsive to the visualization 614 being populated with the one or more national park entities, the information bar 602 may be populated with one or more information panels corresponding to the one or more national park entities. Because the user may desire to view the information panels relating to the driving directions again as opposed to the national park information, the user may invoke the back command 610. Responsive to the invocation of the back command 610, the information bar 602 may be populated with the first information panel, the second information panel 604, the third information panel 606, and/or other information panels regarding the directions using the saved state 612.

Figure 7:
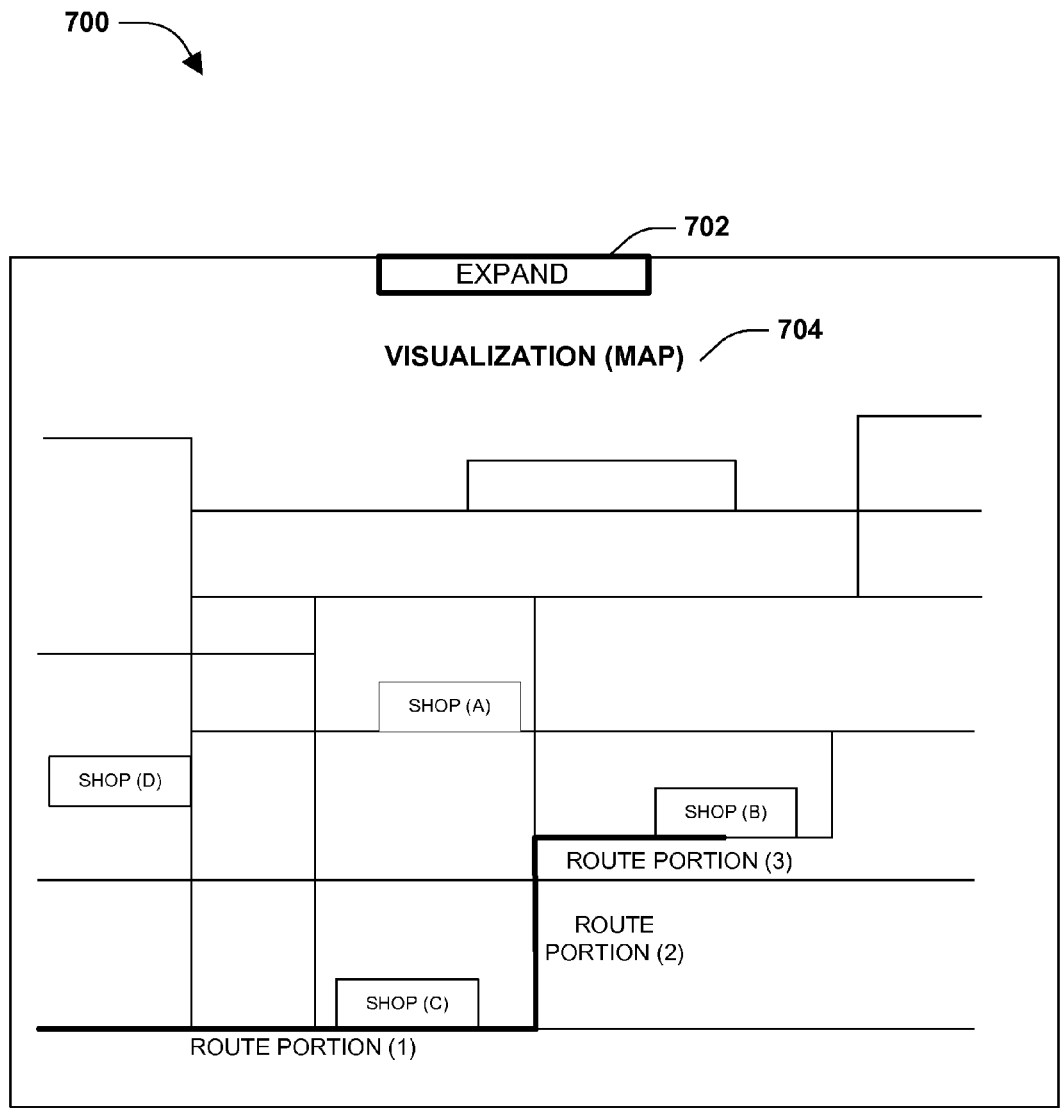
FIG. 7 is an illustration of an example of a visualization associated with an information bar.

FIG. 7 illustrates an example 700 of a visualization 704 associated with an information bar. In one example, the visualization 704 may correspond to a map interface (e.g., which may currently display a map of a local town). It may be appreciated that the visualization 704 may correspond to a variety of interfaces (e.g., an image gallery interface, a search result interface, etc.) and/or a variety of form factors (e.g., a mobile device, a smart phone, a tablet device, a desktop device, a touch enabled device, etc.). In one example, the visualization 704 may have been populated with one or more direction entities based upon a user invoking a directions task (e.g., route portion (1) entity, route portion (2) entity, and route portion (3) entity). Responsive to the visualization 704 being populated, the information bar may have been populated with one or more information panels corresponding to the one or more direction entities.

A collapse command may be associated with the information bar. The collapse command may be invoked to visually hide at least a portion of the information bar, which may provide additional visible space for the visualization 704. An expand command 702 may be displayed in response to the collapse command. Responsive to a user invoking the expand command 702, the information bar may be visually expanded (e.g., such that one or more information panels within the information bar may be visible).

Figure 8:
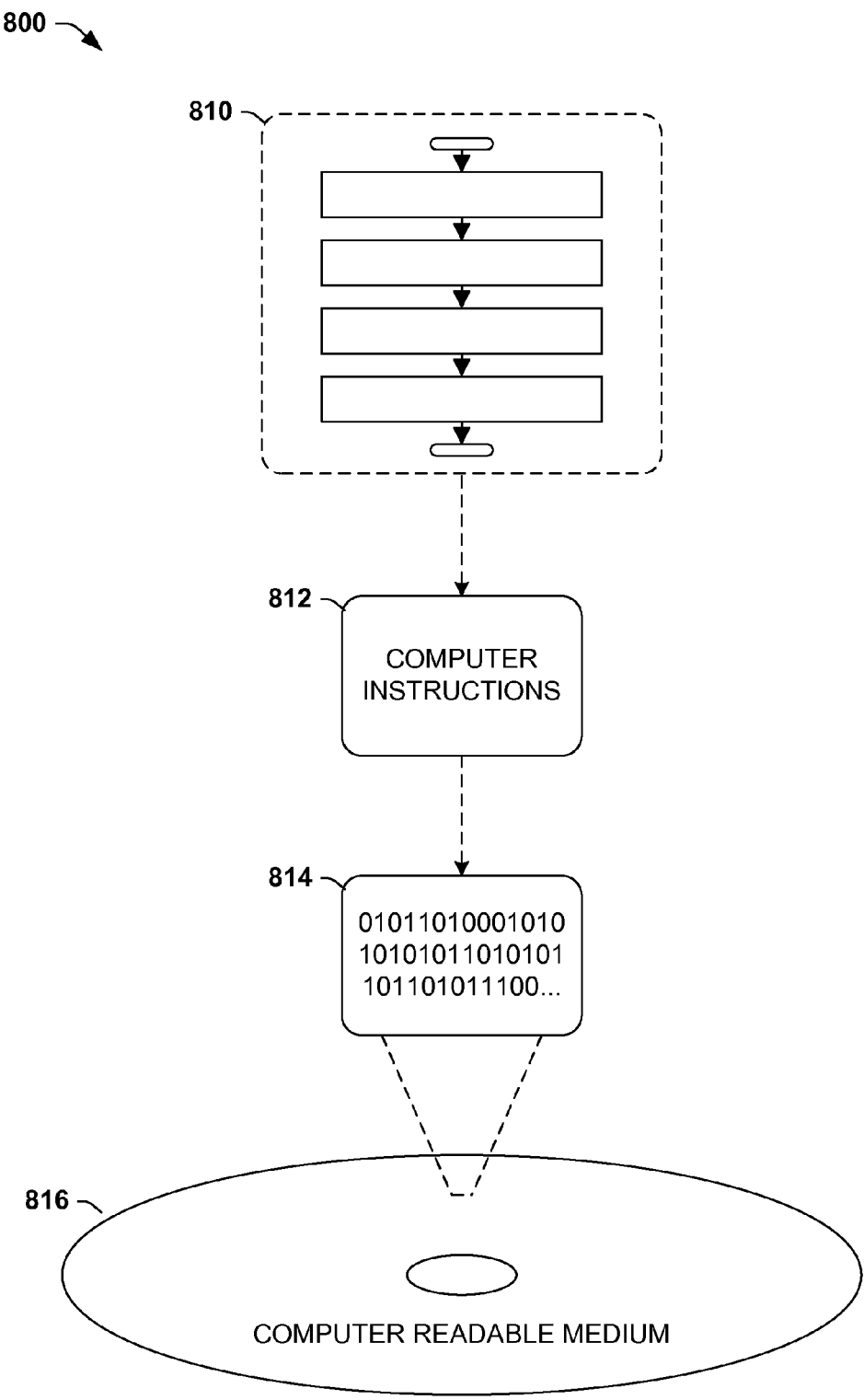
FIG. 8 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 814. This computer-readable data 814 in turn comprises a set of computer instructions 812 configured to operate according to one or more of the principles set forth herein. In one such embodiment 800, the processor-executable computer instructions 812 may be configured to perform a method 810, such as at least some of the exemplary method 100 of FIG. 1, for example. In another such embodiment, the processor-executable instructions 812 may be configured to implement a system, such as at least some of the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
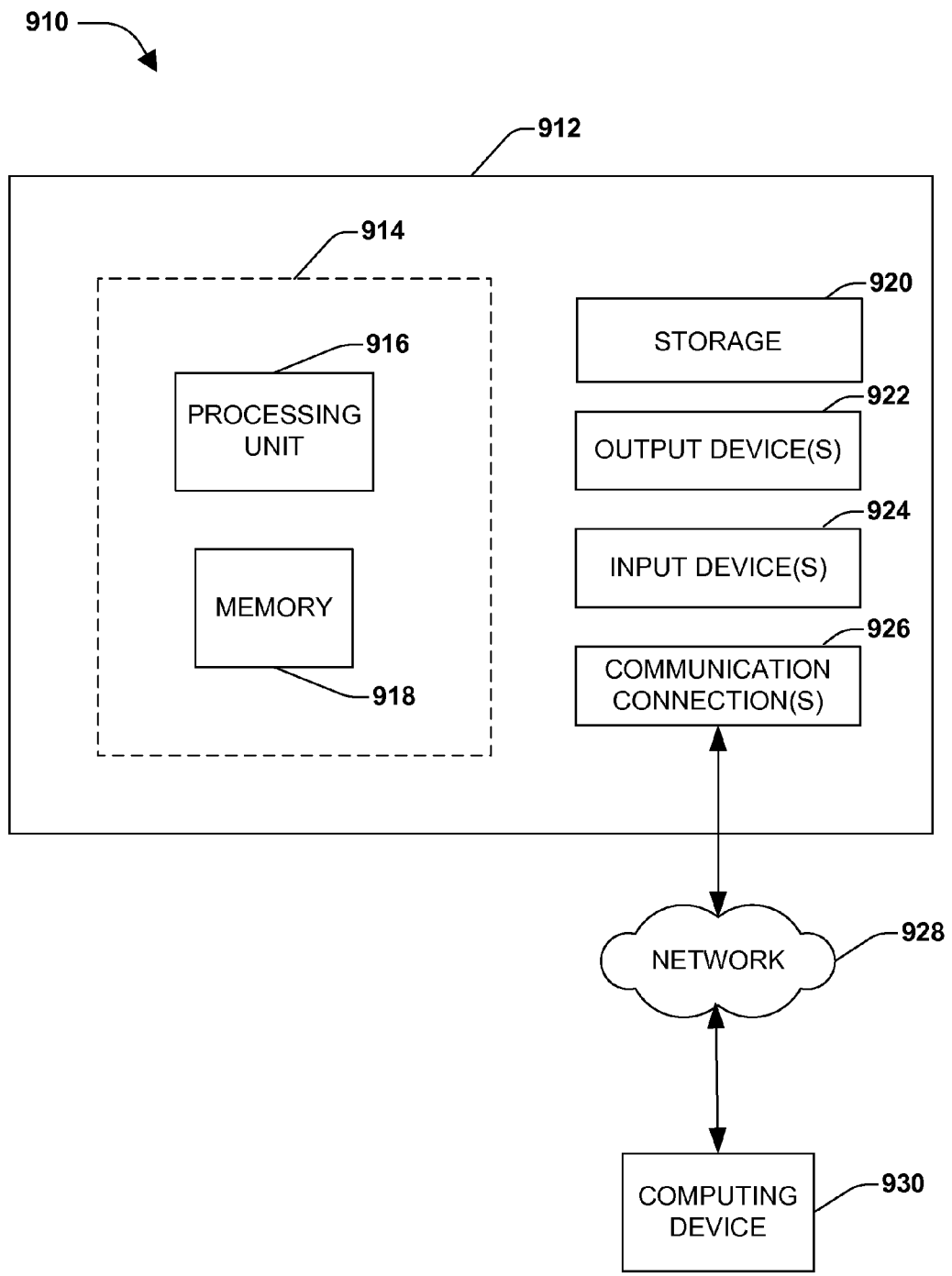
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for maintaining an information bar associated with a map visualization, comprising:
presenting an information bar as a scrollable bar across a first portion of the map visualization;
responsive to the map visualization being populated with entities comprising a first entity and a second entity, populating the information bar with one or more information panels having content associated with the entities and comprising a first information panel corresponding to the first entity and a second information panel corresponding to the second entity;

receiving a selection within the map visualization of the first entity; and responsive to the selection within the map visualization of the first entity, upon determining the first information panel is not visible within the information bar, automatically scrolling the information bar to the first information panel to visually present the first information panel.

2. The method of claim 1, comprising:

responsive to the selection of the first entity, highlighting the first information panel.

3. The method of claim 1, comprising:

responsive to a selection of the first information panel, populating the first information panel with additional details associated with the first entity.

4. The method of claim 1, comprising:

presenting an input bar across a second portion of the map visualization, the second portion adjacent to the first portion; and responsive to the map visualization being populated with one or more other entities based upon a search submitted within the input bar, visually hiding the input bar and presenting the information bar across at least a portion of the second portion.

5. The method of claim 1, wherein the entities populated within the map visualization correspond to one or more portions of a route, and the one or more information panels correspond to at least one portion of the one or more portions of the route.

6. The method of claim 1, comprising:

saving a state of the information bar as a saved state, the state corresponding to the one or more information panels.

7. The method of claim 6, comprising:

removing at least one of the one or more information panels from the information bar associated with the saved state; and populating the information bar with one or more new information panels responsive to the removing.

8. The method of claim 7, comprising:

responsive to a back command, removing at least one of the one or more new information panels from the information bar.

9. The method of claim 1, comprising:

visually presenting a first set of information panels populated within the information bar; and responsive to a scroll command, visually presenting a second set of information panels populated within the information bar.

10. The method of claim 1, comprising:

responsive to a collapse command, visually hiding the information bar and presenting an expand command.

11. The method of claim 1, comprising:

adjusting a height of the information bar based upon at least one of the one or more information panels populated within the information bar.

12. The method of claim 1, at least one of the first information panel or the second information panel comprising at least one of an error message related to a task, a search result, a direction within a list of directions, a business listing for a business, a browse-able collection of maps, a browse-able collection of locations, or a browse-able collection of businesses.

13. A computing system comprising:

a processor; and computer storage memory having computer-executable instructions stored thereon which, when executed by the processor, configure the computing system to:

present an information bar as a scrollable bar across a first portion of a map visualization;

present an input bar across a second portion of the map visualization;

responsive to the map visualization being populated with entities comprising a first entity and a second entity based upon a search submitted within the input bar:

visually hide the input bar and present the information bar across at least a portion of the second portion, and populate the information bar with one or more information panels having content associated with the entities and comprising a first information panel corresponding to the first entity and a second information panel corresponding to the second entity, the map visualization displaying a directional route comprising at least a first selectable route portion and a second selectable route portion;

receiving a selection of the second selectable route portion; and responsive to the selection of the second selectable route portion, providing route details for the second selectable route portion within the second information panel.

14. The system of claim 13, the information bar component configured to:

responsive to a selection within the map visualization of the first entity, automatically scroll the information bar to the first information panel corresponding to the first entity and highlight the first information panel.

15. The system of claim 13, the information bar component configured to: save a state of the information bar as a saved state; and restore the state of the information bar using the saved state.

16. The system of claim 13, the information bar component configured to:

responsive to a selection of the first information panel, populate the first information panel with additional details associated with the first entity and highlight the first entity within the map visualization.

17. The system of claim 13, the information bar component configured to: responsive to a collapse command, visually hide the information bar and present an expand command.

18. A computer-readable device medium, excluding signals, comprising instructions that when executed perform a method for maintaining an information bar associated with a map visualization, comprising:

presenting an information bar across a map interface;

responsive to the map interface being populated with entities comprising a first entity and a second entity, populating the information bar with information panels having content associated with the entities and comprising a first information panel corresponding to the first entity and a second information panel corresponding to the second entity; and responsive to a selection of one of the entities by the map interface, for which a corresponding information panel is not visible in the information bar, automatically scrolling the information bar to present the corresponding information panel in the information bar and highlighting the corresponding information panel.

19. The method of claim 18, comprising:

responsive to a selection of an information panel within the information bar, populating the information panel with additional details associated with a corresponding entity and highlighting the corresponding entity within the map interface.

20. The method of claim 18, comprising:

the entities populated within the map interface corresponding to portions of a route, and the information panels corresponding to portions of the route.

\* \* \* \* \*